United States Patent
Gansler et al.

(10) Patent No.: US 7,263,453 B1
(45) Date of Patent: Aug. 28, 2007

(54) SHAFT FEEDBACK SENSOR ERROR DETECTION

(75) Inventors: Michael Thomas Gansler, Candia, NH (US); Michael Field Kaufman, New Boston, NH (US); Soundararajan Manthiri, Bedford, NH (US); David W. Robinson, Manchester, NH (US); Jason M. Sachs, Goffstown, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 29 days.

(21) Appl. No.: 11/038,777

(22) Filed: Jan. 19, 2005

Related U.S. Application Data

(60) Provisional application No. 60/537,837, filed on Jan. 21, 2004.

(51) Int. Cl.
*G01D 18/00* (2006.01)
(52) U.S. Cl. ...................................... 702/104
(58) Field of Classification Search ................ 702/104, 702/150, 151, 152, 153, 154, 95
See application file for complete search history.

(56) References Cited

U.S. PATENT DOCUMENTS

| | | | | |
|---|---|---|---|---|
| 2,805,677 A | * | 9/1957 | Baird | 324/207.18 |
| 3,364,483 A | * | 1/1968 | Butler et al. | 342/59 |
| 4,342,517 A | * | 8/1982 | Johnson et al. | 356/460 |
| 4,513,425 A | * | 4/1985 | Karagoz et al. | 373/88 |
| 5,187,872 A | * | 2/1993 | Dufour | 702/95 |
| 5,297,063 A | * | 3/1994 | Cage | 702/92 |
| 5,469,369 A | * | 11/1995 | Rose-Pehrsson et al. | 702/27 |
| 5,781,450 A | * | 7/1998 | Glasson | 702/153 |
| 6,307,365 B1 | | 10/2001 | Santos et al. | 324/207.12 |
| 6,401,052 B1 | * | 6/2002 | Herb et al. | 702/150 |
| 6,433,536 B1 | * | 8/2002 | Yundt et al. | 324/207.22 |
| 6,693,423 B2 | * | 2/2004 | Weser | 702/151 |
| 2001/0056333 A1 | * | 12/2001 | Dietmayer | 702/130 |
| 2003/0215030 A1 | * | 11/2003 | Hurley | 375/322 |

* cited by examiner

*Primary Examiner*—John Barlow
*Assistant Examiner*—Jonathan Moffat

(57) ABSTRACT

Methods and apparatus for detecting a sensor angle error in a system in which a measured quantity is determined on the basis of a phase of a signal. A signal derived from the measurement of multiple sensors is ascribed to a vector in a two-dimensional space, and a norm is calculated characterizing that vector. A value is calculated characterizing variation of that norm over a specified period of time and that value is compared with a threshold in order to identify a sensor fault.

5 Claims, 4 Drawing Sheets

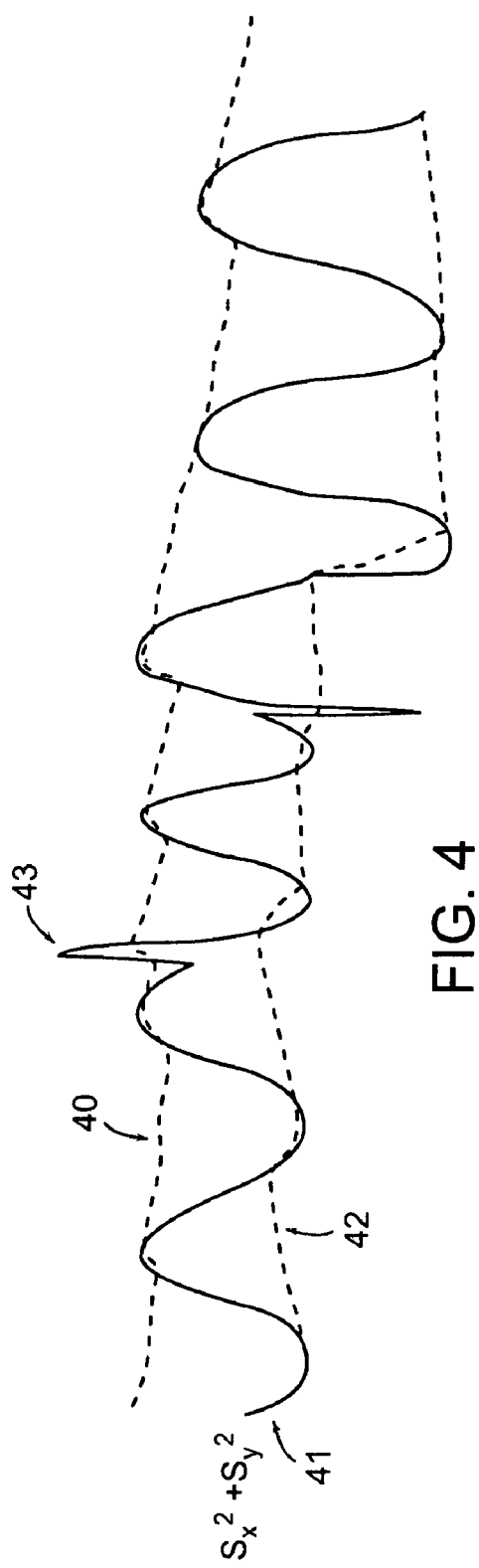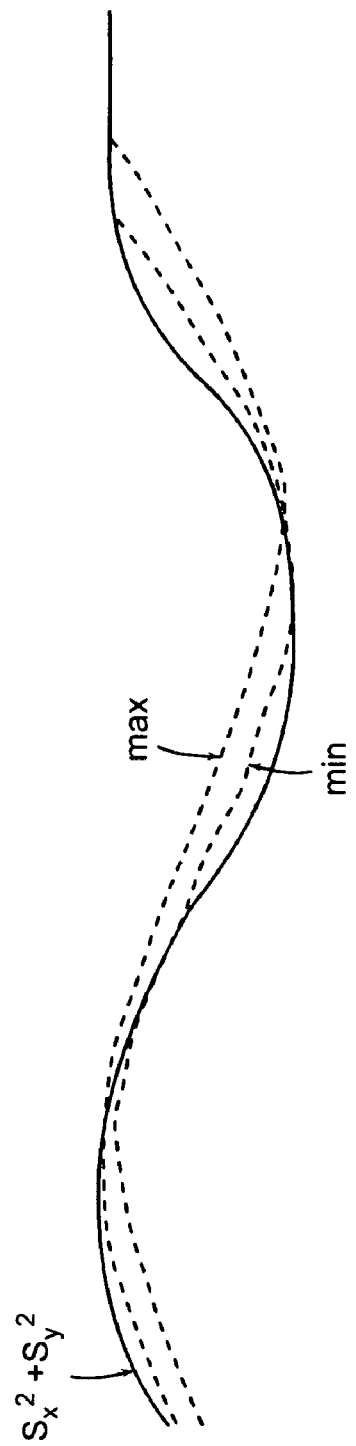

SHAFT FEEDBACK SENSOR ERROR DETECTION

The present application claims the benefit of priority from U.S. Provisional Application Ser. No. 60/537,837, filed Jan. 21, 2004, which is incorporated herein by reference.

TECHNICAL FIELD

The present invention pertains to error detection in systems, such as sensor systems, in which certain signals bear a fixed phase relationship to each other.

BACKGROUND ART

A class of sensors, including, for example, position sensors (rotary or linear), or optical interferometers (including Sagnac-Effect gyroscopes, for example), derive a measure of a sensed quantity, such as rotation angle, based on the phase of a periodic envelope of a modulated waveform, shown in FIG. 1, where the modulated waveform is a higher-frequency excitation 'carrier.' The phase may be derived by sensing two quadrature components of the demodulated waveform. For analog measured signals of the form, $$S_{xm} = A \cos \theta_s \cos \omega_e t$$

$$S_{ym} = A \sin \theta_s \cos \omega_e t',$$

where $\omega_e$ is the angular frequency of the excitation signal, the demodulated signals are of the form:

$$S_x = A_x \cos \theta_s + B_x$$

$$S_y = A_y \sin \theta_s + B_y$$

The physical meaning of the sensor angle $\theta_s$ depends upon the particular application. For example, in the case of a magnetic rotary sensor (as described in U.S. Pat. No. 6,443,536). $P_s$ sensor magnet poles may be spaced at equal submultiples of an armature revolution such that the relationship of $\theta_s$ to mechanical position $\theta_m$ of the shaft is given by $$\theta_s = \frac{P_s}{2} \theta_m.$$

Other embodiments of measurements, such as of linear displacement (as described in U.S. Pat. No. 6,307,365) or rotation rate (as described in U.S. Pat. No. 4,342,517), for example, based upon the measurement of a phase angle, may all advantageously benefit from the invention described herein. Sensing by electrical, magnetic, optical or any other means leading to the sensing of a modulation from which phase may be derived are encompassed within the scope of the present invention.

More generally, the quadrature components, $S_x$ and $S_y$, may be derived from two or more sensor signals, $S_k$, of known phase relationship, and, thus, may be represented as $$S_x = A_{xc} \cos \theta_s + A_{xs} \sin \theta_s + B_x = \sum_k w_{kx} S_k$$

$$S_y = A_{yc} \cos \theta_s + A_{ys} \sin \theta_s + B_y = \sum_k w_{ky} S_k.$$

It is sufficient to sensor two signals (not necessarily orthogonal) that span the 2-dimensional space in which the phase angle to be measured is represented as a polar angle. In the case of rotation sensors, it is convenient to space N magnetic sensors magnet poles at equal submultiples of a revolution, such that:

$$w_{kx} = \frac{2}{N} \cos \frac{2\pi k}{N}$$

$$w_{ky} = \frac{2}{N} \sin \frac{2\pi k}{N},$$

however the present invention does not limit the choice of basis function set for deriving the sensor phase angle $\theta_s$.

The sensor angle $\theta_s$ may be estimated by ordinary rectangular-to-polar coordinate conversion, i.e., as $\tan^{-1}(S_y/S_x)$, but only to the extent to which the derived signals $S_x$ and $X_y$ are in quadrature and have equal magnitudes (i.e., if the singular values $A_1$ and $A_2$ of the matrix $$\begin{bmatrix} A_{xc} & A_{xs} \\ A_{yc} & A_{ys} \end{bmatrix}$$

are equal) and have zero DC offsets (i.e., the extent to which both $B_y$ and $B_x$ are zero). Gain imbalance ($A_1 \neq A_2$) and offsets may be caused by out-of-tolerance, or degraded, components, and their variability with time may give rise to inaccurate measurement and erratic performance of control systems based on the sensed quantities. For example, if a control loop is used to the control speed of a motor based on an inaccurate measure of rotary position, a periodic speed error ("tach ripple") will result.

Consequently, a simple method for detecting sensor errors in a context of quadrature detection is highly desirable so as to enable fault-handling procedures to be taken in cases of failure or degradation of the sort discussed above.

SUMMARY OF THE INVENTION

In accordance with preferred embodiments of the present invention, a method is provided for detecting a sensor angle error in a system employing a rectangular-to-polar coordinate conversion. The method has the steps of:
  a. ascribing multiple sensor measurements to a vector in a two-dimensional space;
  b. calculating a norm characterizing the vector;
  c. determining a value characterizing variation of the norm over a specified period of time; and
  d. comparing the value characterizing variation of the norm to a specified threshold value.

In accordance with alternate embodiments of the present invention, the step of determining a value characterizing variation of the norm may include determining a first value characterizing a time-averaged minimum of the norm, determining a second value characterizing a time-averaged maximum of the norm, and then calculating the value characterizing variation of the norm as a function of the maximum and minimum of the norm. More particularly, the function of the maximum and the minimum of the norm may be a ratio of the maximum to the minimum.

In accordance with yet other embodiments of the invention, an improvement is provided to a sensor of the type employing a rectangular-to-polar coordinate conversion. The improvement has a plurality of sensors for generating analog sensor signals that together define a vector in a two-dimensional space and circuitry for combining the analog sensor signals to create a plurality of demodulated signals of known phase relationship. The improvement also has a norm processor for combining the plurality of demodulated signals to derive a norm characterizing the vector and, finally, a comparator for comparing a function of the norm to a specified threshold. Again, the function of the norm may be a ratio of a maximum to a minimum of the norm over the course of a cycle.

BRIEF DESCRIPTION OF THE DRAWINGS

The foregoing features of the invention will be more readily understood by reference to the following detailed description, taken with reference to the accompanying drawings, in which:

FIG. 4 plots typical time records of a norm and of its running minimum and maximum values, in accordance with embodiments of the present invention; and FIG. 5 plots typical time records of a norm and of its running minimum and maximum values, in a case where the frequency of vector rotation is too low for effective characterization by the time-averaged extrema.

DETAILED DESCRIPTION OF THE INVENTION

Figure 1:
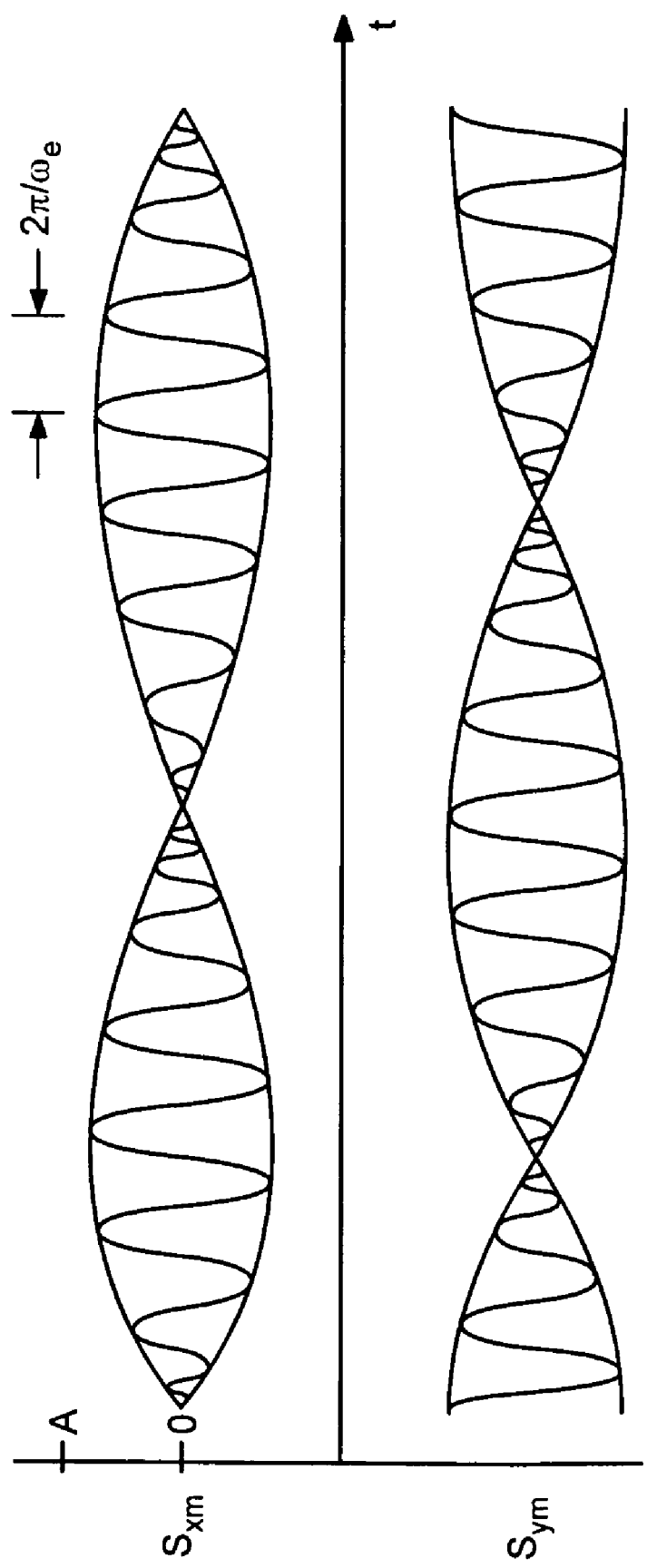
FIG. 1 shows typical quadrature sensor waveform.
Figure 2A:
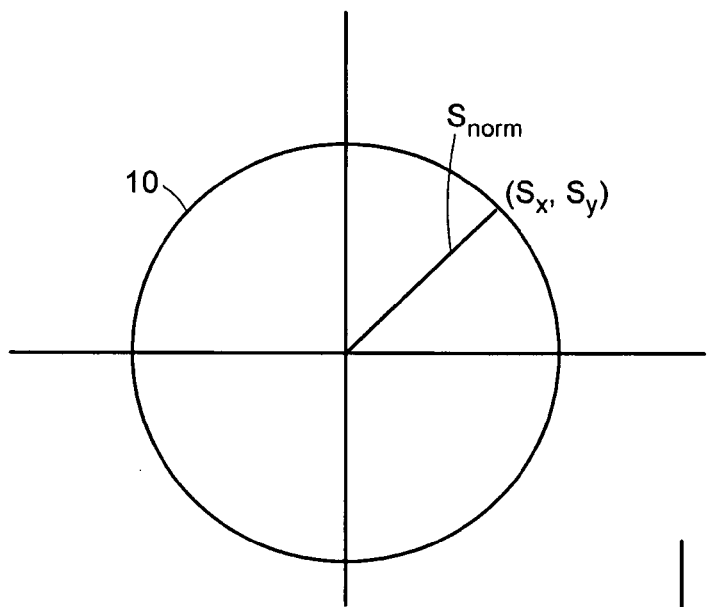
FIGS. 2A through 2C depict representations of the sensed quadrature components of a detected signal in a two-dimensional plane, in accordance with embodiments of the present invention.

The apparatus and methods provided in accordance with embodiments of the present invention provide for extraction of a polar coordinate from a set of sensor signals of known phase relationship between, or among, them. Referring to FIG. 2A, the locus, in the two-dimensional plane, of quadrature signals, $S_x$ and $S_y$, is depicted by curve 10, which is a circle in the ideal case that $S_x$ and $S_y$ represent true quadrature components and that gain amplitudes $A_1$ and $A_2$ are preferably balanced. Polar angle $\hat{\theta}_s$ represents an estimate of the true sensor angle $\theta_s$. The square modulus $S_x^2 + S_y^2$ represents the square of the instantaneous radius vector from the origin to locus 10. In the ideal case, it maintains a constant value. The square modulus is an example of a norm, referred to generally as $S_{norm}$, that is defined over vectors in a space (in this case, two-dimensional), and other norms may also be employed, within the scope of the present invention.

Figure 2B:
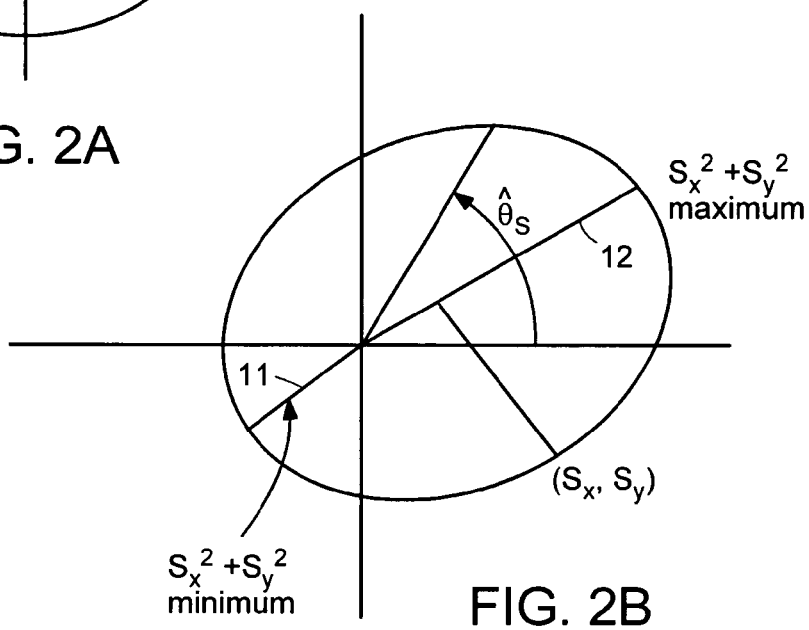
Figure 2C:
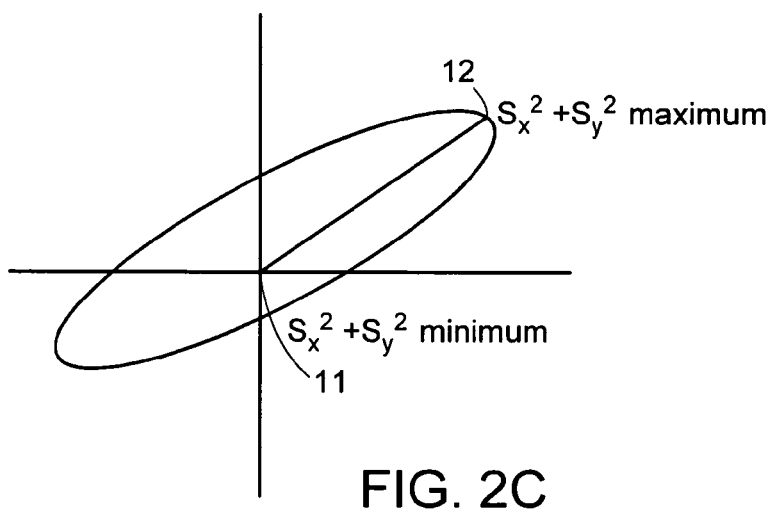

In a non-ideal instance, the norm does not maintain a constant value, as in FIG. 2A, but, rather, varies between a minimum value 11 and a maximum value 12 over the course of a specified period of time, namely that of a complete rotation, as shown in FIG. 2B. The offset locus of vectors $(S_x, S_y)$ shown in FIG. 2B corresponds, by way of example, to the case where there is a DC offset in the +x direction. The elliptical locus of vectors $(S_x, S_y)$ shown in FIG. 2C corresponds to the instance in which gain amplitudes $A_1$ and $A_2$ are unbalanced. A ratio of the maximum-to-minimum values of the norm, $$R \equiv \frac{\max(S_{norm})}{\min(S_{norm})},$$

is an indicator of signal quality of the sensor signals used to derive the sensor angle. If R is identically unity, then $\hat{\theta}_s = \tan^{-1}(S_y/S_x)$ is an accurate estimate of sensor angle $\theta$.

A sensor angle error $\tilde{\theta}_s$ may be defined as the signal difference between the true sensor angle $\theta_x$ and the estimated sensor angle $\hat{\theta}_x = \tan^{-1}(S_y/S_x)$. The correlation of ratio R with peak-to-peak sensor angle error $\tilde{\theta}_s$ may be shown, and has been borne out empirically. Therefore, ratio R may serve as a proxy for the error, and, more particularly, for detecting a specified error threshold.

Figure 3:
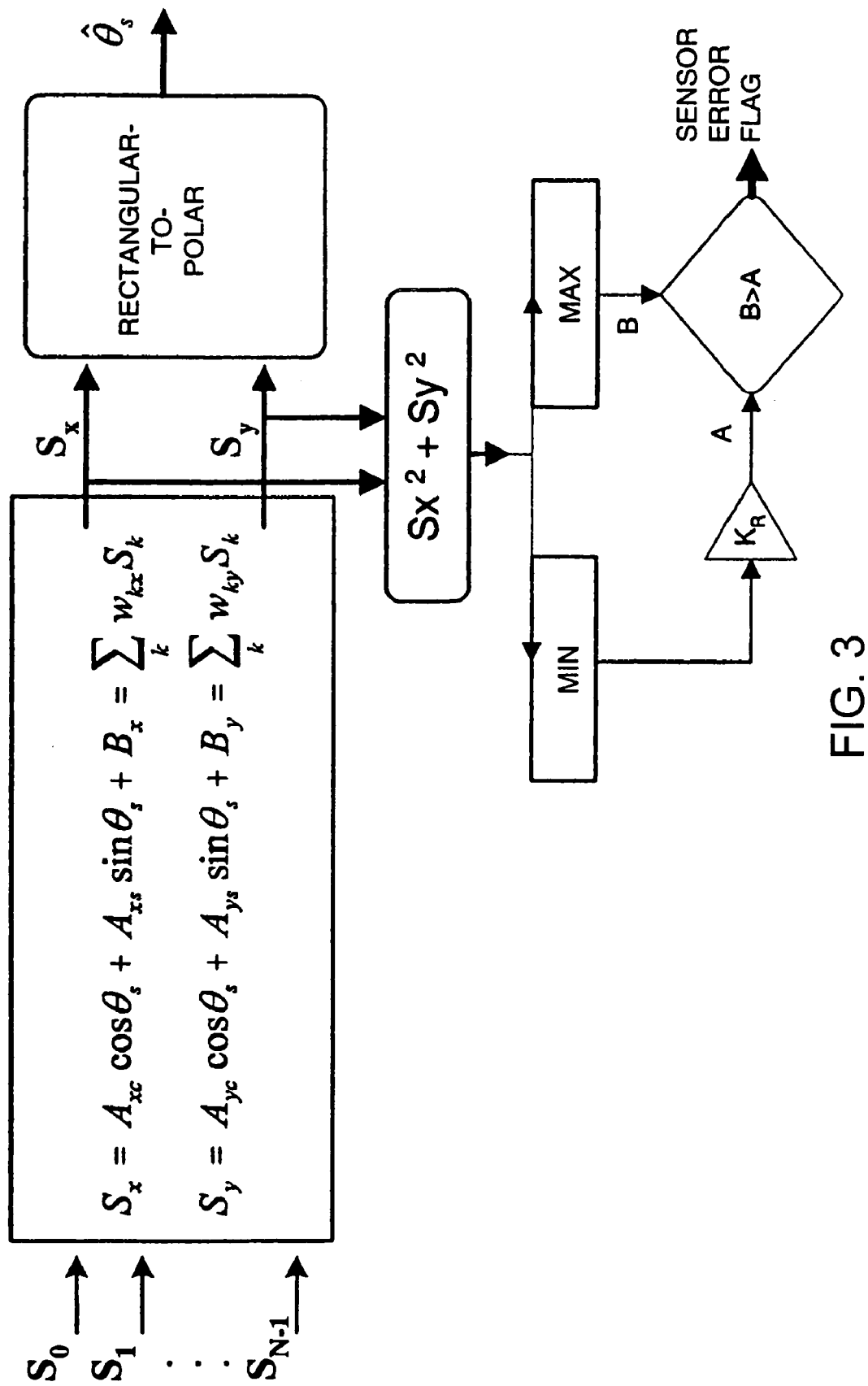
FIG. 3 is a schematic diagram of processing to detect sensor errors in accordance with embodiments of the present invention.

Referring to FIG. 3, one test that may be performed, in accordance with the present invention, to establish whether the sensor angle error $\tilde{\theta}_s$ is within acceptable bounds for a particular application, uses the minimum and maximum values of $S_{norm}$. The ratio $$R \equiv \frac{\max(S_{norm})}{\min(S_{norm})}$$

is tested and compared with a specified threshold value, $K_R$, and, if the ratio R exceeds the threshold value $K_R$, a sensor error flag is set, and action taken to correct the error or safely shut down the device.

In one embodiment of the invention, the extremal values of $S_{norm}$, which will be referred to herein as $r_{max}^2$ and $r_{min}^2$, respectively, are tested as follows: A norm is computed, $$\rho \equiv \frac{r_{max}^2 - r_{min}^2}{r_{max}^2 + r_{min}^2},$$

and, if $\rho$ does not exceed a specified threshold K, then sensor accuracy is considered acceptable, unless other tests indicate otherwise. On the other hand, if $\rho$ exceeds K, an angle measurement error is indicated. The measure $\rho$ has been found to correlate with peak-to-peak angle measurement error. In particular, a choice of K=0.5 corresponds to a peak-to-peak angle measurement error in the range of 0.25–0.33 rad.

It is to be understood that the threshold value K need not be constant or fixed, and may, instead, in accordance with alternate embodiments of the invention, vary as a function of various operating parameters of the system in which the sensor is employed. For example, in the context of a motor rotation sensor, threshold K may vary as a function of either motor speed, ambient temperature, or both. It may be advantageous to loosen tolerances and to allow for an excursion in sensor error value if the source of the excursion is known.

Moreover, threshold K is not restricted to a singular value, and multiple thresholds may be set. When measured conditions on $S_{norm}$ exceed successive specified thresholds, specified actions may be taken by the system incorporating the sensor. A first and second threshold may correspond, for example, to 'warning' and 'fault' conditions.

In accordance with preferred embodiments of the invention, the external values of $S_{norm}$ are determined using nonlinear filters, with a time constant governing their decay back to the instantaneous value of $S_{norm}$, as shown in FIG. 4, wherein curves 40 and 42 depict the computed values of $r_{max}^2$ and $R_{mm}^2$, respectively, while curve 41 depicts the instantaneous value of $S_{norm}$, all as functions of time. Glitches, as at point 43 in the data record, do not appreciably impact the error detection algorithm as described.

One example of a nonlinear filter that may be advantageously be employed is a low-pass filter with different decay rates depending on the relative values of the filter input x and the filter output y. The decay rate $K_+$ is used if input is greater than output; the decay rate $K_-$ is used if input is less than output. This is summarized in the following equation:

$$\frac{dy}{dt} = \begin{cases} K_+(x-y) & x \geq y \\ K_-(x-y) & x < y. \end{cases}$$

If $K_+ > K_-$, then this filter computes a maximum (the filter output decays downward more slowly than it decays upward). If $K_+ < K_-$, then this filter computes a minimum.

It will be appreciated, by persons of ordinary skill in the signal processing art, that the decay times of the nonlinear filters used to derive value of $S_{norm}$, must be properly chosen and impose limits on the speeds of operation over which the present invention may advantageously be applied. Inappropriate operating conditions may give rise to the situation depicted in FIG. 5 wherein $R_{max}^2$ and $r_{min}^2$ are not effectively derived over an entire cycle.

It is to be understood that the detection of other variations in $S_{norm}$, besides those described above by way of example, is within the scope of the present invention. A thresholds based on the external values of $S_{norm}$ provides one example of sensor error detection in accordance with this invention. For example, if $r_{min}^2$ falls below a specified threshold, this may be indicative of probable sensor errors. This advantageously serves to detect cases where the signal content may be too small to be useful, as in the case of gradual power supply sag, but where the signal magnitudes change slowly enough that short-term variation in $S_{norm}$ remains beneath the detection threshold.

As another example, the time record of $S_{norm}$ may be high-pass filtered to derive a measure of variation of $S_{norm}$ during the course of a cycle, and it, too, may advantageously be compared to a specified threshold in order to sense unacceptable excursions in derived sensor angle.

The described embodiments of the invention are intended to be merely exemplary and numerous variations and modifications will be apparent to those skilled in the art. All such variations and modification are intended to be within the scope of the present invention as defined in the appended claims.

What is claimed is:

1. A method for detecting a sensor angle error in a system employing a rectangular-to-polar coordinate conversion, the method comprising:
   a. ascribing multiple sensor measurements to a vector in a two-dimensional space;
   b. calculating a norm characterizing the vector;
   c. determining a single scalar value characterizing variation of the norm over a specified period of time, the single scalar value amenable to scalar comparison; and
   d. comparing the single scalar value characterizing variation of the norm to a specified threshold value; and
   e. enabling fault-handling procedures in case of variation of the norm exceeding the specified threshold.

2. A method in accordance with claim 1, wherein the step of determining a single scalar value characterizing variations of the norm includes:
   i. determining a first value characterizing a time-averaged minimum of the norm;
   ii. determining a second value characterizing a time-averaged maximum of the norm; and
   iii. calculating the single scalar value characterizing variation of the norm as a function of the maximum and minimum of the norm.

3. A method in accordance with claim 2, wherein the function of the maximum and the minimum of the norm is a ratio of the maximum to the minimum.

4. In a sensor system of the type employing a rectangular-to-polar coordinate conversion, an improvement comprising;
   a. a plurality of sensors for generating analog sensor signals together defining a vector in a two-dimensional space;
   b circuitry for combining the analog sensor signals to create a plurality of demodulated signals of known phase relationship;
   c. a norm processor for combining the plurality of demodulated signals to derive a single scalar norm characterizing the vector; and
   d. a comparator for comparing a function of the single, scalar norm to a specified threshold, wherein the function characterizes behavior of the norm over a specified period of time.

5. The improvement of claim 4, wherein the function is a ratio of a maximum to a minimum of the norm over the course of a cycle.

* * * * *

UNITED STATES PATENT AND TRADEMARK OFFICE
CERTIFICATE OF CORRECTION

| | | |
|---|---|---|
| PATENT NO. | : 7,263,453 B1 | Page 1 of 1 |
| APPLICATION NO. | : 11/038777 | |
| DATED | : August 28, 2007 | |
| INVENTOR(S) | : Michael Thomas Gansler et al. | |

It is certified that error appears in the above-identified patent and that said Letters Patent is hereby corrected as shown below:

In Col. 6, line 19
replace "variations"
with --variation--

Signed and Sealed this

Twentieth Day of November, 2007

JON W. DUDAS
*Director of the United States Patent and Trademark Office*